E. AUFIERO.
MECHANICAL HORN AGITATOR.
APPLICATION FILED MAR. 11, 1915.
1,164,250.
Patented Dec. 14, 1915.
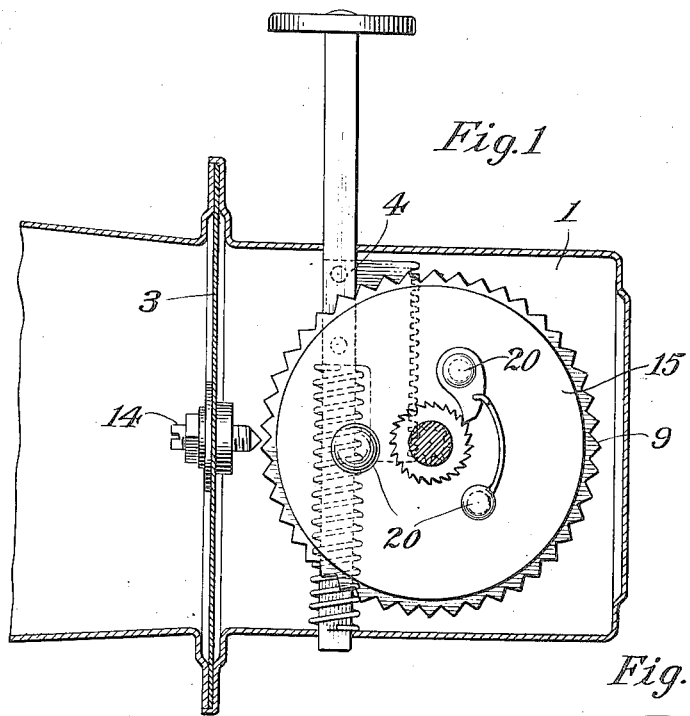
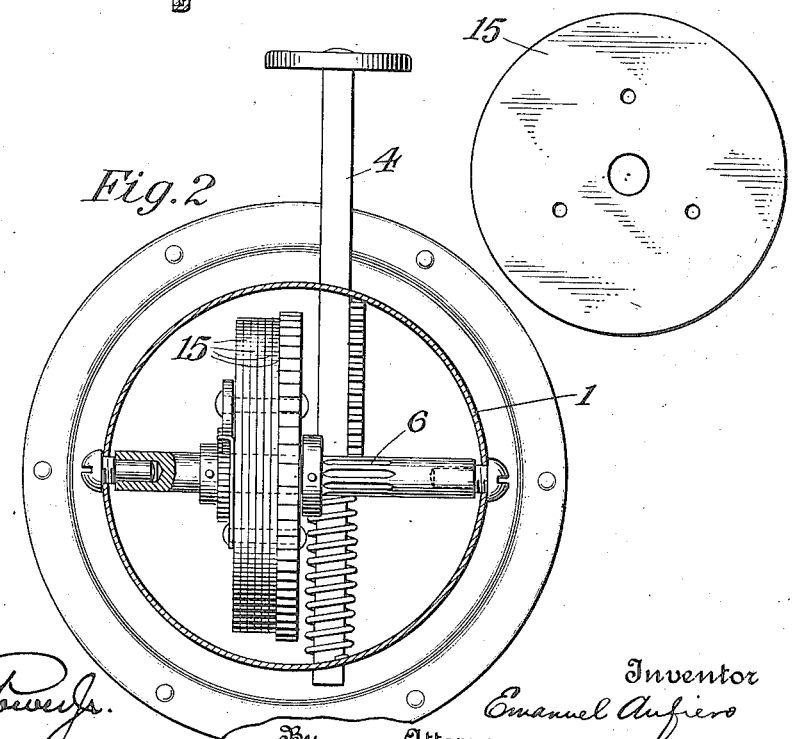
Witnesses:
Arthur G. H. Powers Jr.
E. J. Esselstyn
Inventor
Emanuel Aufiero
By W. B. Morton
Attorney

UNITED STATES PATENT OFFICE.

EMANUEL AUFIERO, OF BROOKLYN, NEW YORK.

MECHANICAL-HORN AGITATOR.

1,164,250.           Specification of Letters Patent.     Patented Dec. 14, 1915.

Application filed March 11, 1915. Serial No. 13,594.

*To all whom it may concern:*

Be it known that I, EMANUEL AUFIERO, a citizen of the United States, and a resident of the borough of Brooklyn, Kings county, New York, have invented new and useful Improvements in Mechanical-Horn Agitators, of which the following is a specification.

This invention relates to momentum wheels, particularly of the character employed in such apparatus as mechanical horns, for maintaining continuous rotation of the disk for effecting the vibration of the resonant diaphragm.

The object of my invention is to provide a momentum wheel which may be made in large numbers with original uniformity of mass so that each wheel will be balanced relative to the center of rotation without individual modification, such as is necessary for cast metals such as now employed for the purpose.

A further object of the invention is to provide a momentum wheel which will have sufficient tensile strength to withstand a high velocity of rotation and also sufficiently high specific gravity to permit the use of wheels of small size.

In the accompanying drawings, I have illustrated my improved momentum wheel as applied to the serrated disk of a mechanical horn of the construction shown in my co-pending application No. 852,700 filed July 23, 1914 of which application this application is a division.

In the said drawings, Figure 1 is a longitudinal section of a suitable horn with my improved momentum wheel; and Fig. 2 is a transverse sectional view on line 2—2 of Fig. 1. Fig. 3 is a detail view showing the fly wheel construction.

The mechanism of the horn, which is fully described in my above mentioned application, comprises a casing 1 for containing the operating mechanism and providing a support for the sounding diaphragm 3. The diaphragm is provided at its center with a pin 14 which engages the serrated edge of the disk 9 which is rotated continuously at a high rate of speed to produce the desired tone.

The rotation of the disk is most conveniently produced by a reciprocating manually operated member, in the present case a rack 4 mounted for transverse reciprocation across the casing 1. The disk 9 is mounted on a shaft supported in the casing and is driven from the shaft by means of a pawl and ratchet connection, so that the alternate rotation of the shaft in opposite direction through the medium of the rack and the pinion 6 formed in the shaft, will rotate the disk in one direction.

In a horn of this type, which is known to the trade as a mechanical horn, it is essential for commercial exploitation that the sound produced by the horn closely simulates the sound of the more expensive motor driven horns in which the serrated disk is continuously driven by a small electric or other suitable motor. It is therefore important that on the return or idle stroke of the rack the rotation of the disk be maintained as uniform as possible, to which end I have devised my improved momentum wheel which forms the subject-matter of this application.

The serrated disk to which the stored energy of the momentum wheel must be applied is preferably made of steel so that its serrations will not be too rapidly worn away. To form such disk of sufficient thickness to act as its own momentum wheel, it would necessitate its being made by drop forging, or other expensive process, and then, after machining, balanced by individual test and drilling away sufficient metal at different points to make its center of gravity coincide with its center of rotation. I have discovered that steel may be rolled in sheets in such manner that its mass per unit of area is uniform throughout. I therefore cut the serrated disk from a sheet of this character and then add to its weight by attaching to its side face by suitable screws or bolts 20 a number of disks 15 cut from rolled steel. Any number of disks may be employed to produce the desired weight and they may be of any desirable thickness consistent with ease of rolling and cutting. By cutting the disk and the bolt and shaft holes with an accurate die, the mass of the disk is substantially symmetrical with the center of rotation, and no special test or adjustment of the wheel to secure its balance is necessary. The rolling of the steel reduces its normal thickness and increases its specific gravity as well as its tensile strength.

My improved construction greatly cheapens the cost as it not only obviates the expense of special adjustment in the assembling of the devices but the disks themselves may be in large quantities on automatic machinery.

While I have described my momentum wheel as specially desirable for use in mechanical horns, it is obvious that it may be used to advantage wherever such wheels are necessary, for instance, in mechanical toys, gyroscopes, etc.

Having thus described my invention, what I claim and desire to secure by Letters Patent is:

1. In a device of the character described, the combination of a disk of rolled sheet metal supported for continuous rotation around its center of mass and a plurality of rings of rolled sheet metal rigidly attached to said disk with their centers of mass coincident with the axis of rotation of said disk.

2. In a device of the character described, the combination of a member to be maintained in continuous rotation, and a momentum wheel therefor comprising a plurality of disks of cold rolled metal attached to said member with their centers of mass coincident with the axis of rotation.

3. In a device of the character described, the combination of a disk or wheel of rolled metal to be maintained in continuous rotation, and a weight for said wheel comprising a disk or ring of rolled metal rigidly attached to said disk or wheel with their centers of mass coincident with their axes of rotation.

Signed at Brooklyn in the county of Kings and State of New York this 26 day of February, 1915.

EMANUEL AUFIERO.

Witnesses:
  WALTER B. LITTLEFIELD,
  H. BERKE.